United States Patent
Grainger et al.

(10) Patent No.: US 7,069,717 B2
(45) Date of Patent: Jul. 4, 2006

(54) HYBRID PROPULSION SYSTEM

(75) Inventors: Chris Grainger, Poway, CA (US); Frank Macklin, Poway, CA (US)

(73) Assignee: SpaceDev, Inc., Poway, CA (US)

( * ) Notice: Subject to any disclaimer, the term of this patent is extended or adjusted under 35 U.S.C. 154(b) by 31 days.

(21) Appl. No.: 10/825,924

(22) Filed: Apr. 15, 2004

(65) Prior Publication Data

US 2005/0229583 A1  Oct. 20, 2005

(51) Int. Cl.
F02K 9/72 (2006.01)
F02K 9/00 (2006.01)
F02K 9/42 (2006.01)
F02K 9/44 (2006.01)

(52) U.S. Cl. .................... 60/220; 60/230; 60/251; 60/257; 60/259

(58) Field of Classification Search ............ 60/251, 60/257, 258, 259, 260, 228, 229, 230, 220; 244/169
See application file for complete search history.

(56) References Cited

U.S. PATENT DOCUMENTS

| | | | | |
|---|---|---|---|---|
| 3,507,296 A | * | 4/1970 | Fix et al. .................... | 137/810 |
| 4,424,679 A | * | 1/1984 | Holzman .................... | 60/251 |
| 4,802,333 A | * | 2/1989 | Smith ........................ | 60/260 |
| 4,880,185 A | * | 11/1989 | Apfel ......................... | 60/259 |
| 5,010,730 A | | 4/1991 | Knuth et al. | |
| 5,026,259 A | * | 6/1991 | Whitehead et al. ........ | 417/379 |
| 5,099,645 A | | 3/1992 | Schuler et al. | |
| 5,572,864 A | | 11/1996 | Jones | |
| 5,715,675 A | | 2/1998 | Smith et al. | |
| 6,250,072 B1 | * | 6/2001 | Jacobson et al. ........... | 60/251 |
| 6,393,830 B1 | * | 5/2002 | Hamke et al. .............. | 60/229 |
| 6,601,380 B1 | | 8/2003 | Knuth et al. | |
| 6,640,536 B1 | | 11/2003 | Kline et al. | |
| 6,679,049 B1 | | 1/2004 | Kline et al. | |
| 6,684,625 B1 | | 2/2004 | Kline et al. | |

OTHER PUBLICATIONS

Space Daily "Surrey Fires Micro Electric Thruster," Oct. 25, 1999, http://www.spacedaily.com/news/microsat-99j.html, viewed Mar. 8, 2006.*

* cited by examiner

*Primary Examiner*—Ted Kim
(74) *Attorney, Agent, or Firm*—Fish & Richardson P.C.; Fred C. Hernandez

(57) ABSTRACT

Disclosed is a propulsion system for a spacecraft. The propulsion system includes a supply of oxidizer and at least one nozzle. A conduit fluidly couples the supply of oxidizer and the nozzle. The conduit provides a pathway for oxidizer to flow in a downstream direction from the supply of oxidizer toward and into the nozzle. A pressure regulator is coupled to the conduit and is interposed between the supply of oxidizer and the nozzle, wherein the pressure regulator regulates the pressure of oxidizer flowing through the conduit and downstream of the pressure regulator to a pressure at or below the pressure required to maintain the oxidizer in a gas state to ensure that the any oxidizer flowing through the conduit is in a gas state prior to entering the nozzle. The conduit supplies oxidizer from the supply of oxidizer to a hybrid rocket motor.

15 Claims, 6 Drawing Sheets

HYBRID PROPULSION SYSTEM

STATEMENT OF GOVERNMENT RIGHTS

This invention was made with U.S. Government support under Contract No. F2960-02-C-0079 awarded by the United States Air Force. The U.S. Government has certain rights in the invention.

TECHNICAL FIELD

This invention relates to propulsion systems, and more particularly to a hybrid propulsion system having a fine attitude control system.

BACKGROUND

Liquid systems and solid systems are the two basic types of rocket propulsion systems that are generally used in the rocket industry. In a solid propellant system, solid rocket fuel and an oxidizer are mixed together and allowed to cure inside a rocket case to form a solid propellant material, which is then ignited in the rocket case. Upon ignition, pressure forms within the rocket case and gases are released through a nozzle to produce thrust. In a solid propellant system, the solid propellant burns uninterrupted until all the propellant is exhausted, which can be undesirable in certain circumstances. Solid systems can be quite complicated, and are subject to several requirements during manufacture in order to minimize safety risks during use. For example, the solid propellant must be crack-free, as propellant grains which contain cracks present a risk of explosive failure of the vehicle. Solid propellant systems can be inadvertently ignited by mechanical shock and static electricity. Consequently, the manufacturing process requires extreme safety precautions, which increases manufacturing costs.

In a liquid system, a liquid oxidizer is fed into a combustion chamber in combination with a liquid fuel. The oxidizer and liquid fuel are mixed in the combustion chamber, where they react to produce gases under high temperature and high pressure. The gases exhaust through a nozzle from the combustion chamber to thereby produce thrust. Although widely used, there are certain drawbacks associated with liquid propulsion systems. One such drawback is that the mixing of reactants requires a high performance pressurization system for the fuel and oxidizer, which can contributes to a high cost with respect to both money and maintenance. Like solids, a liquid system can also explode since the oxidizer and fuels can be inadvertently mixed together. Another drawback is that exotic—and therefore expensive—materials must be used for the various components of the system, which increases the monetary cost of the systems.

Another type of rocket propulsion system are the hybrid systems, which are generally not as widely used as liquid and solid rocket fuel systems. A hybrid system combines aspects of both liquid systems and solid systems in that one propellant is stored as a solid and another propellant is stored as a liquid. In a typical system, the solid material is used as the fuel and the liquid material is used as the oxidizer. A variety of materials can be used as the fuel, including Plexiglas (polymethyl methacrylate (PMMA)), high density polyethylene (HDPE), hydroxyl terminated polybutadiene (HTPB), etc. Nitrous Oxide is a commonly used as the oxidizer, although other oxidizers can be used.

Hybrid systems have characteristics that can be highly desirable for certain situations and uses. For example, a hybrid system generally has higher specific impulse than solid systems which is the change in momentum per unit mass for the rocket fuel. Thus, a hybrid system can generate a high level of "push" for each unit of fuel that is used. Another advantage associated with hybrid propulsion systems is the complete separability of the fuel from the principal oxidizer. This inhibits the potential for inadvertent ignition or catastrophic failure so that hybrid systems are inherently immune to inadvertent explosion. Yet another advantage is that hybrid systems have the ability to easily start, stop, and restart the combustion of the rocket fuel.

There is currently a need for an improved hybrid propulsion system that in addition to providing general propulsion, also provides finely tunable attitude control.

SUMMARY

Disclosed is an attitude control system for a spacecraft, comprising a supply of oxidizer; at least one nozzle; a conduit fluidly coupling the supply of oxidizer and the nozzle, wherein the conduit provides a pathway for oxidizer to flow in a downstream direction from the supply of oxidizer toward and into the nozzle; and a pressure regulator coupled to the conduit and interposed between the supply of oxidizer and the nozzle, wherein the pressure regulator regulates the pressure of oxidizer at a location downstream of the pressure regulator and upstream of the nozzle to a set point pressure at or below a first pressure. The first pressure comprises the pressure required to maintain the oxidizer in a gas state to ensure that the any oxidizer flowing through the conduit is in a gas state prior to entering the nozzle.

Also disclosed is a method of generating thrust for a spacecraft, comprising: providing a supply of oxidizer, wherein the supply of oxidizer contains oxidizer in both a liquid state and a gas state; flowing oxidizer from the supply of oxidizer to a hybrid rocket motor of the spacecraft; flowing oxidizer from the supply of oxidizer to a nozzle of an attitude control system of the spacecraft; and regulating the pressure of oxidizer flowing to the attitude control system. The pressure is regulated to a pressure below the vapor pressure of the oxidizer for a temperature of the oxidizer at a location upstream of the nozzle to ensure that the oxidizer is in a gas state when flowing into the nozzle of the attitude control system.

Also disclosed is a propulsion system for a spacecraft, comprising: a supply of oxidizer; at least one nozzle; a conduit fluidly coupling the supply of oxidizer and the nozzle, wherein the conduit provides a pathway for oxidizer to flow in a downstream direction from the supply of oxidizer toward and into the nozzle; a pressure regulator coupled to the conduit and interposed between the supply of oxidizer and the nozzle, wherein the pressure regulator regulates the pressure of oxidizer flowing through the conduit and downstream of the pressure regulator to pressure at or below a first pressure, wherein the first pressure comprises the pressure required to maintain the oxidizer in a gas state to ensure that the any oxidizer flowing through the conduit is in a gas state prior to entering the nozzle; and a hybrid rocket motor, wherein the conduit supplies oxidizer from the supply of oxidizer to the hybrid rocket motor.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
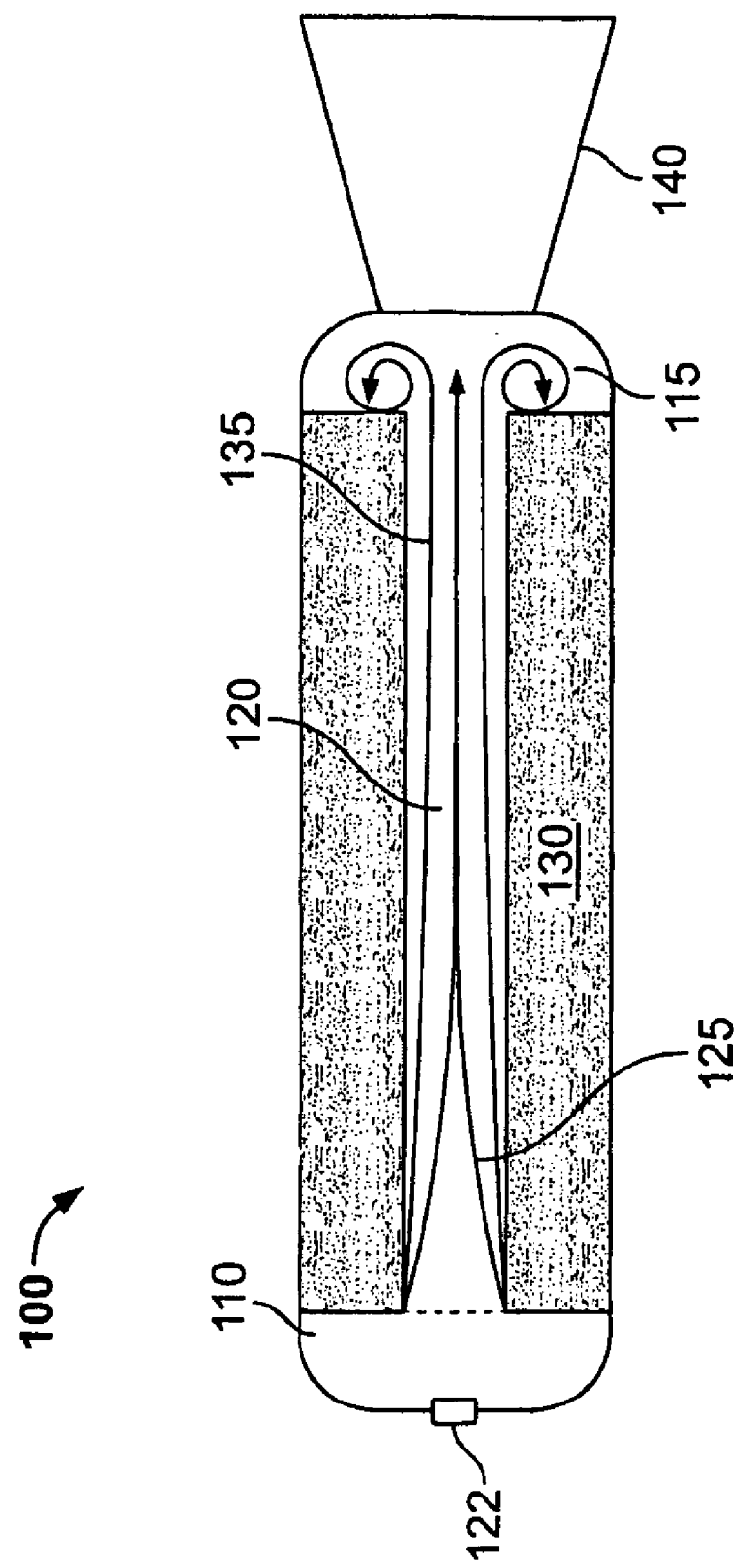
FIG. 1 is a schematic view of a hybrid propulsion system.

FIG. 1 shows a schematic of the configuration of a single port hybrid rocket motor 100. The motor 100 generally includes a main chamber having a precombustion chamber 110, a mixing chamber 115, and an elongate combustion port 120 extending therebetween. A solid fuel 130 is located within the main chamber. An injector 122 communicates with the precombustion chamber 110 for injecting a liquid phase oxidizer into the precombustion chamber 110. In use, the oxidizer is injected into the precombustion chamber 110 via the injector 122. The injected oxidizer is gasified and flows axially along the combustion port 120, forming a boundary layer edge 125 over the solid fuel 130. The boundary layer edge 125 is usually turbulent in nature over a large portion of the length of the combustion port 120. A diffusion flame zone 135 exists within the boundary layer edge 125, which diffusion flame zone 135 extends over the entire length of the solid fuel 130.

The heat generated in the flame, which is located approximately 20–30% of the boundary layer thickness above the fuel surface, is transferred to the wall mainly by convection. The wall heat flux evaporates the solid fuel and the resultant fuel vapor is transported to the flame where it reacts with the oxidizer, which is transported from the free stream by turbulent diffusion mechanisms. The unburned fuel that travels beneath the flame, the unburned oxidizer in the free stream, and the flame combustion products mix and further react in the mixing chamber 115. The hot gases expands through the nozzle 140 to deliver the required thrust.

Figure 2:
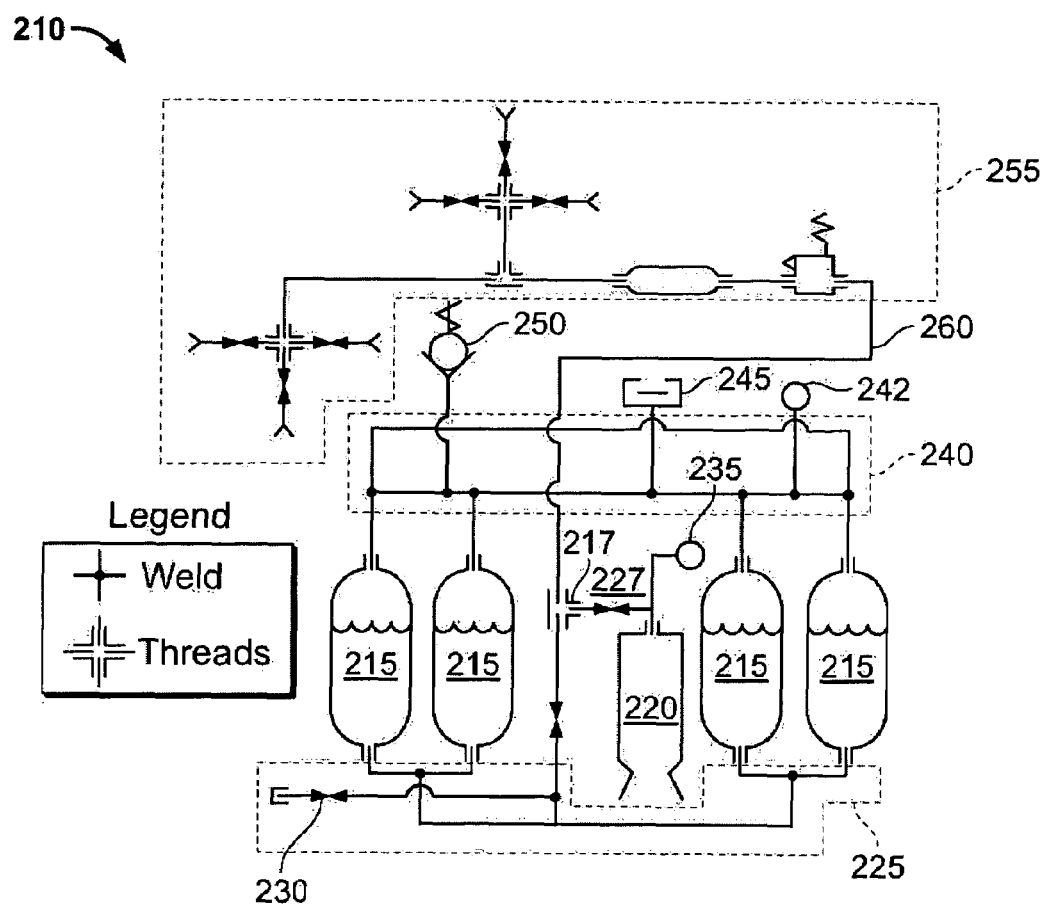
FIG. 2 is a schematic view of a maneuvering and transport vehicle (MTV) incorporating a hybrid propulsion system.

FIG. 2 shows a schematic view of a hybrid propulsion module (HPM) 210 that can be incorporated into a maneuvering and transport vehicle, as described in detail below. The HPM module 210 includes one or more oxidizer tanks 215 and a tube 220 containing solid rocket fuel. The tube 220 is configured according to the hybrid rocket motor configuration described above with respect to FIG. 1. That is, the tube 220 has an injector at one end (which communicates with the oxidizer tanks 215) and a nozzle at an opposed end. Oxidizer in a liquid phase from the tanks 215 enters the tube 220 through the injector and combustion products emerge from the tube 220 through the nozzle for generating thrust, as will be known to those skilled in the art. At least one igniter (not shown) is coupled to the tube 220 for igniting the liquid fuel within a precombustion chamber of the tube 220, as described above.

An aft manifold system 225 (comprised of one or more conduits through which the oxidizer can flow) couples each of the oxidizer tanks 215 to a motor conduit 217. The manifold system 225 and the motor conduit 217 collectively provide at least one pathway through which oxidizer can travel into the tube 220 from the tanks 215. As mentioned, an injector (not shown) is positioned at the entryway to the tube 220 in between the motor conduit 217 and the tube 220 for injecting oxidizer from the oxidizer tanks 215 into the tube 220. As mentioned, the tube 220 is configured as described above with reference to FIG. 1.

A pressure transducer 235 is coupled to the motor conduit 217. In addition, a main feed solenoid valve 227 is positioned along the motor conduit 217 and provides a means to control the flow of oxidizer from one or more of the tanks 215 to the tube 220. An access device 230 comprising a valve is included within or coupled to the aft manifold system 225 to provide access to the oxidizer tanks 215 for filling or draining the tanks.

With reference still to FIG. 2, a fore manifold system 240 is also coupled to each of the oxidizer tanks 215. The fore manifold system 240 is comprised of one or more interconnected conduits through which fluid oxidizer can flow from the tanks 215. As used herein, the term "conduit" means any pathway or lumen through which fluid can flow and includes pipes, tubes, etc. that can be made of any of a plurality of suitable materials. The fore manifold system includes a pressure transducer 242, a burst disk 245, and a relief valve 250. As described below, the fore manifold system provides a pathway through which oxidizer from one or more of the tanks 215 can flow to an attitude control system of the HPM 210.

In one embodiment, the oxidizer tanks 215 house a liquid oxidizer comprised of Nitrous Oxide ($N_2O$). Those skilled in the art will appreciate that Nitrous Oxide is self-pressurizing at room temperature. Accordingly, the high vapor pressure of the Nitrous Oxide can be utilized in the oxidizer tanks to transport the Nitrous Oxide to the tube 220 via the aft manifold 225 and motor conduit 217 without the use of pumps or a pressurization system. Those skilled in the art will appreciate that other types of liquid oxidizers can also be used. The oxidizer can be stored in the tanks 215 within a temperature range such that it exists simultaneously in both a liquid phase and a gas phase. In the case of Nitrous Oxide being used as an oxidizer, the Nitrous Oxide is stored in the tanks 215 at a temperature range of approximately 0 degF to 80 degF and at a pressure of approximately 280 psia to 865 psia. Such a range of pressures and temperatures is sufficient to maintain the Nitrous Oxide within the tanks in both a liquid phase and a gas phase. It should be appreciated that the pressure and temperature ranges can vary based on the substance in the tanks.

In one embodiment, the solid fuel comprises polymethylmethacrylate, although other materials can be used as the solid fuel.

As mentioned above, the hybrid propulsion module 210 further includes an attitude control system (ACS) 255, which is schematically represented by a phantom box in FIG. 2 and described in more detail below with reference to FIG. 3. In one embodiment, an ACS conduit 260 is coupled to the aft manifold system 225. Alternately the ACS conduit may be coupled to the fore manifold system 240. Thus, the ACS conduit 260 and the aft manifold system 225 collectively provide a pathway for the oxidizer to flow to the ACS 255 from one or more of the oxidizer tanks 215. The ACS conduit 260 provides a pathway for liquid oxidizer to flow to the ACS 255 from one or more of the oxidizer tanks 215. In this regard, the ACS conduit 260 is fluidly coupled to the fore manifold system 240.

Figure 3:
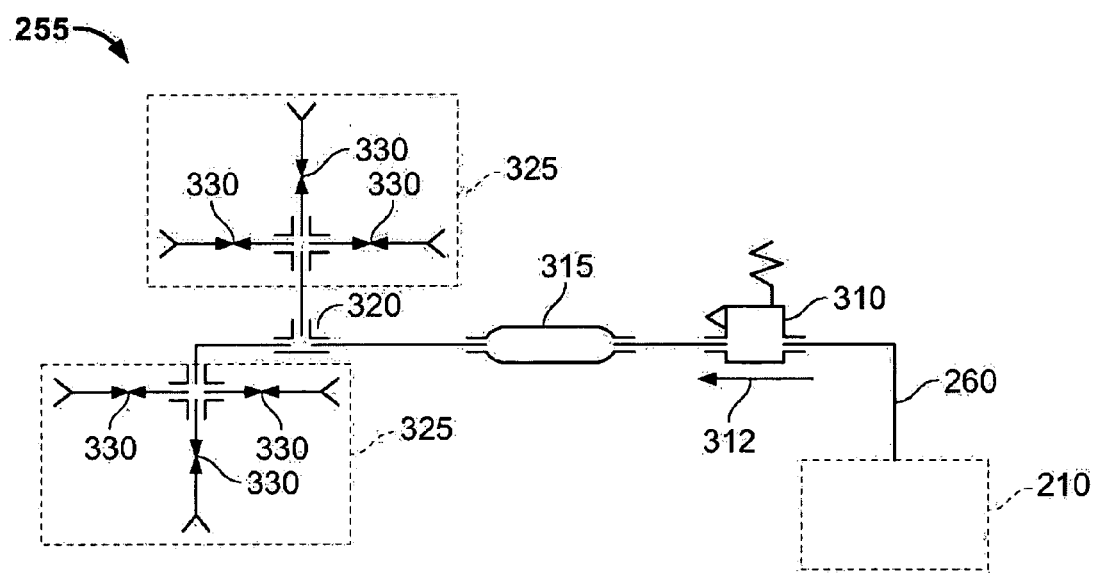
FIG. 3 is an enlarged, schematic view of an attitude control system of the MTV of FIG. 2.

FIG. 3 shows an enlarged, schematic view of a first embodiment of the ACS 255 (the remainder of the HPM 210 is represented by a phantom box 210 in FIG. 3). As discussed, the ACS conduit 260 provides a pathway for liquid fuel to flow from the one or more of the oxidizer tanks 215 into the ACS 255. A pressure regulator 310 is located along the ACS conduit 260, such as at the entryway into the ACS 255. The pressure regulator 310 is configured to regulate the downstream pressure of liquid fuel flowing through the main ACS conduit 260, as described in more detail below. The "downstream" direction is the direction toward the ACS thrusters from the tanks 215 and is represented by the arrow 312 in FIG. 3. The term downstream is also used to denote relative location. For example, a first item or state that is located "downstream" of a second item or state is located in the downstream direction relative to the second item or state. The term "upstream" is the opposite of downstream.

An accumulator 315 can be located along the ACS conduit 260 downstream of the pressure regulator 310 such that the oxidizer (such as Nitrous Oxide) is regulated by the pressure regulator 310 into the accumulator 315. The accumulator 315 functions to reduce or eliminate pressure fluctuations in gas supplied to the thrusters downstream of the accumulator.

At a location 320, the ACS conduit 260 branches into at least one thruster system 325 located downstream of the pressure regulator. Each thruster system 325 includes one or more thrusters 330, wherein the thrusters are fed by the accumulator 315. In the illustrated embodiment, each thruster system 325 includes three thrusters 330 comprised of solenoid thrusters that are arranged in a triad configuration, which is described in more detail below. However, it should be appreciated that the quantity of thrusters 330 per thruster system 325 and the number of thruster systems 325 can vary. For example, each thruster system 325 can include a single thruster 330, two thrusters 330, or three or more thrusters 330.

For the first embodiment, a thrust level of approximately 0.5 lbf is envisioned, which can be tailored by adjusting regulator set pressure. The thruster is envisioned as a on-off solenoid valve closely coupled with a nozzle of appropriate size and expansion ratio. It should be appreciated that the thrust level and the configuration of the thrusters can vary.

In one embodiment, the thrusters 330 do not produce thrust through combustion, but rather produce thrust through the expansion of cold gas expelled from the thrusters. In this system, the cold gas is obtained from the tanks 215 such that the same material that is used as the oxidizer for the rocket motor is also used as the cold gas for achieving thrust in the ACS 255. A cold gas propulsion system is desirable for fine attitude control, as such a system can provide a small minimum impulse bit. In addition, such a system is highly reliable and safe in operation.

As mentioned, the tanks 215 can store the oxidizer simultaneously in both a liquid phase and a gas phase, such as in the case of Nitrous Oxide being used as the oxidizer. In this regard, it is desirable that all of the oxidizer reach the thrusters 330 solely in a gas phase and that none of the oxidizer is in the liquid phase during expulsion from the thrusters 330. It is generally undesirable for the thrusters 330 to expel oxidizer in a liquid form. In other words, the oxidizer should be in a gas phase upstream of the thrusters 330 such that the oxidizer enters the thrusters 330 in the gas phase. Toward this end, the pressure regulator 310 has a set point that is below the pressure that the oxidizer can exist in a liquid state for a given temperature, wherein the given temperature is the temperature of the oxidizer at a location upstream of the thrusters and downstream of the pressure regulator 310, such as the temperature in the accumulator. This ensures that the oxidizer is in a gas phase and will not be in a liquid phase upstream of the thrusters.

In one embodiment, the temperature of the oxidizer contained in the accumulator determines the regulator set point pressure. The pressure regulator is set for a pressure that is lower than the vapor pressure of the particular oxidizer at the lowest temperature of the accumulator. Thus, the pressure regulator ensures that the oxidizer will be in a gas phase in the accumulator by regulating the oxidizer pressure to a pressure that is below the vapor pressure of the oxidizer for the lowest temperature in the accumulator. Pressure regulation of the oxidizer flowing through the ACS conduit to a pressure below the oxidizer's vapor pressure at the accumulator temperature ensures that liquid will not be ejected from the thrusters 330. It should be appreciated that the pressure to which the regulator 310 regulates the pressure can vary based upon the oxidizer that is being used in order to maintain the particular oxidizer in the gas phase upstream of the thrusters 330. To increase the quality of the vapor downstream of the regulator, heat may be added rather than relying on ambient heat capacity of the surroundings.

Figure 4:
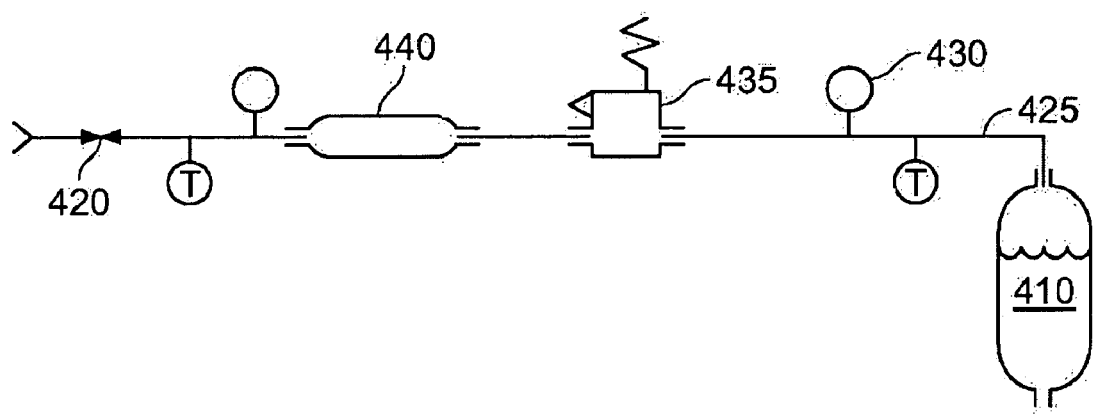
FIG. 4 is a schematic view of a second embodiment of the attitude and control system.

FIG. 4 shows a simplified version of the ACS system, wherein a single oxidizer tank 410 is coupled to a single thruster 420 via an ACS conduit 425. A pressure transducer 430, pressure regulator 435, and an accumulator 440 are located in series along the ACS conduit 425. The configuration shown in FIG. 4 is similar to that shown and described with respect to FIG. 3 although the number of components has been reduced.

Figure 5:
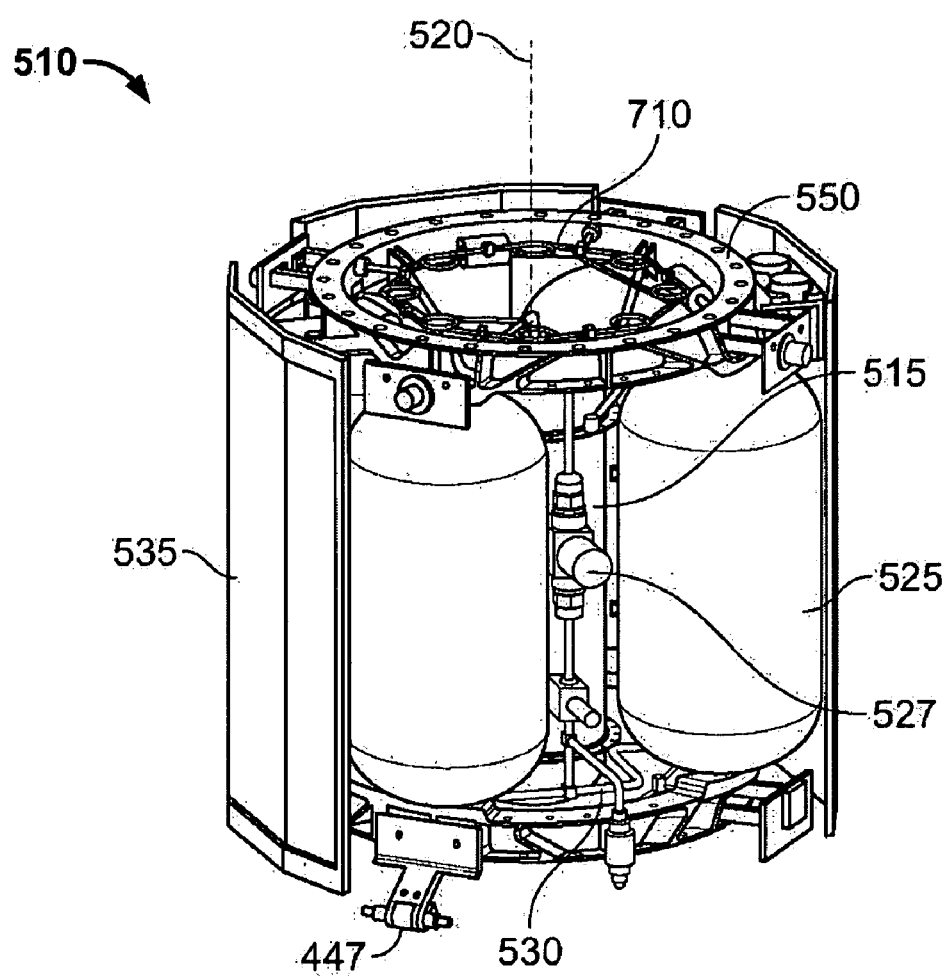
FIG. 5 is a perspective view of the MTV.

As mentioned, the HPM 210 can be incorporated into a maneuvering and transport vehicle (MTV) that can be used, for example, to transport a payload from a drop-off orbit to an operational orbit in space. FIG. 5 shows a perspective, partial cutaway view of one embodiment of an MTV 510 that incorporates the HPM 210. The MTV 510 is generally cylindrical, cubic or hexagonal in shape and includes a central motor 515 that is aligned along a longitudinal axis 520. The motor 515 is configured similarly to the motor shown and described above with reference to FIG. 1. A plurality of oxidizer tanks 525 are arranged in an annular configuration around the central motor 515 and the longitudinal axis 520. In one embodiment, there are four tanks 525 disposed around the motor 515. However, it should be appreciated that any quantity of tanks 525 can be employed. A flow control valve 527 is coupled to an aft manifold system 530 that couples the oxidizer tanks 525 to the motor 515. A plurality of solar array panels 535 can be located on the MTV 510. For clarity of illustration, the solar panels are not shown in FIG. 6.

With reference still to FIG. 5, a fore manifold system 710 is located on an upper region of the MTV 525 above the tanks. The fore manifold system 710 includes a plurality of conduits that provide pathways for liquid fuel to flow out of the tanks 525. In one embodiment, at least one gas thruster 447 is coupled to the fore manifold system via another conduit (not shown). The at least one gas thruster 447 is part of an ACS system of the MTV 510, wherein the ACS system is configured according to the system described above with reference to FIGS. 3 and 4.

In one embodiment, the MTV has a height of approximately 20 inches and a width of approximately 22 inches.

Figure 6:
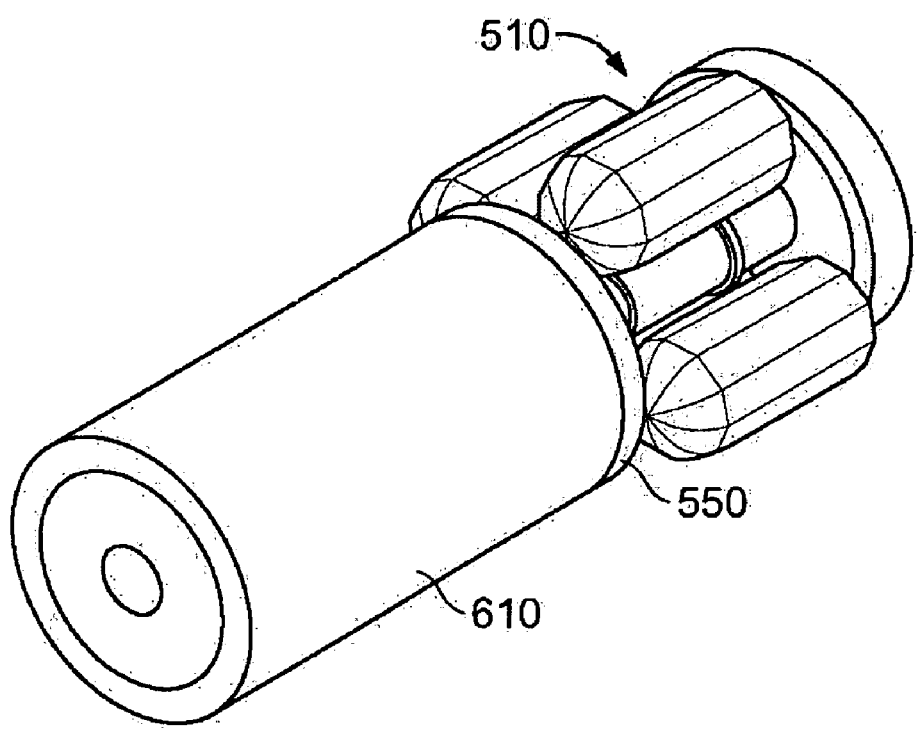
FIG. 6 is a perspective view of the MTV coupled to a payload.

With reference to FIG. 5, the MTV 510 further includes a payload interface 550 that is located on a forward end of the MTV 510. The payload interface 550 comprises a coupling device or mechanism that is used to attach a payload to the MTV. In the illustrated embodiment, the payload interface comprises an annular structure having a plurality of attachment points that can be used to attach the MTV 510 to a payload, such as, for example, a satellite. FIG. 6 shows a schematic view of the MTV 510 attached to a payload 610. In the illustrated embodiment, the payload 610 comprises a satellite. However, it should be appreciated that the other devices can be attached to the MTV 510.

A number of embodiments of the invention have been described. Nevertheless, it will be understood that various modifications may be made without departing from the spirit and scope of the invention. Accordingly, other embodiments are within the scope of the following claims.

What is claimed is:

1. An attitude control and propulsion system for a spacecraft, comprising:
    a supply of oxidizer;
    at least one attitude control nozzle that expels only the oxidizer;
    a conduit fluidly coupling the supply of oxidizer and the attitude control nozzle, wherein the conduit provides a pathway for oxidizer to flow in a downstream direction from the supply of oxidizer toward and into the attitude control nozzle;
    a pressure regulator coupled to the conduit and interposed between the supply of oxidizer and the attitude control nozzle, wherein the pressure regulator regulates the pressure of oxidizer at a location downstream of the pressure regulator and upstream of the attitude control nozzle to a set point pressure at or below a first pressure, wherein the first pressure comprises the pressure required to maintain the oxidizer in a gas state to ensure that the any oxidizer flowing through the conduit is in a gas state prior to entering the attitude control nozzle; a gaseous oxidizer accumulator coupled between the pressure regulator and the attitude control nozzle;
    wherein the attitude control nozzle is positioned so that thrust produced by the attitude control nozzle adjusts the attitude of the spacecraft and the attitude control nozzle produces its thrust through the expansion of the oxidizer, without combustion of the oxidizer, as the oxidizer in the gas state is expelled from the attitude control nozzle; and
    a hybrid rocket motor having a main nozzle, the hybrid rocket motor including a combustion chamber in which the oxidizer interacts with a solid fuel to generate thrust via the main nozzle.

2. The system of claim 1, wherein the oxidizer comprises Nitrous Oxide.

3. The system of claim 2, wherein the supply of oxidizer contains Nitrous Oxide simultaneously in both a gas state and a liquid state.

4. The system of claim 3, wherein oxidizer located in the conduit upstream of the pressure regulator is in a liquid state.

5. The system of claim 3, wherein oxidizer located in the conduit upstream of the pressure regulator is in both a liquid state and a gas state.

6. The system of claim 1, wherein the first pressure is the vapor pressure of the oxidizer at a given temperature.

7. The system of claim 1, wherein the supply of oxidizer comprises at least one propellant tank.

8. The system of claim 7, wherein the supply of oxidizer comprises a plurality of propellant tanks.

9. The system of claim 8, wherein the conduit includes a manifold that connects all of the oxidizer tanks to the attitude control nozzle.

10. The system of claim 8, wherein the at least one attitude control nozzle includes a plurality of nozzles.

11. The system of claim 1, wherein the conduit supplies oxidizer to the hybrid rocket motor.

12. A method of controlling attitude and providing propulsion of a spacecraft, comprising:
    providing a supply of oxidizer, wherein the supply of oxidizer contains oxidizer in both a liquid state and a gas state;
    flowing oxidizer from the supply of oxidizer to a hybrid rocket motor of the spacecraft, wherein the hybrid rocket motor includes a combustion chamber and a main nozzle;
    flowing oxidizer from the supply of oxidizer to an attitude control nozzle of an attitude control system of the spacecraft;
    regulating the pressure of oxidizer flowing to the attitude control system, wherein the pressure is regulated to a pressure below the vapor pressure of the oxidizer for a temperature of the oxidizer at a location upstream of the attitude control nozzle to ensure that the oxidizer is in a gas state when flowing into the attitude control nozzle of the attitude control system, flowing the oxidizer into a gaseous accumulator downstream of the pressure regulator; and
    expelling only the oxidizer, in a gas state, from the attitude control nozzle to produce thrust through the expansion of the gaseous oxidizer without combustion of the gaseous oxidizer.

13. The method of claim 12, wherein the hybrid rocket motor includes a supply of solid rocket fuel, and wherein the oxidizer interacts with the solid rocket fuel to generate thrust from the hybrid rocket motor.

14. The method of claim 12, wherein the oxidizer comprises Nitrous Oxide.

15. The method of claim 12, additionally comprising generating no more than 0.5 lbf of thrust by the attitude and control system.

* * * * *